Sept. 5, 1961 J. MORKOSKI 2,998,854
DISK HARROW
Filed Dec. 19, 1958 2 Sheets-Sheet 1
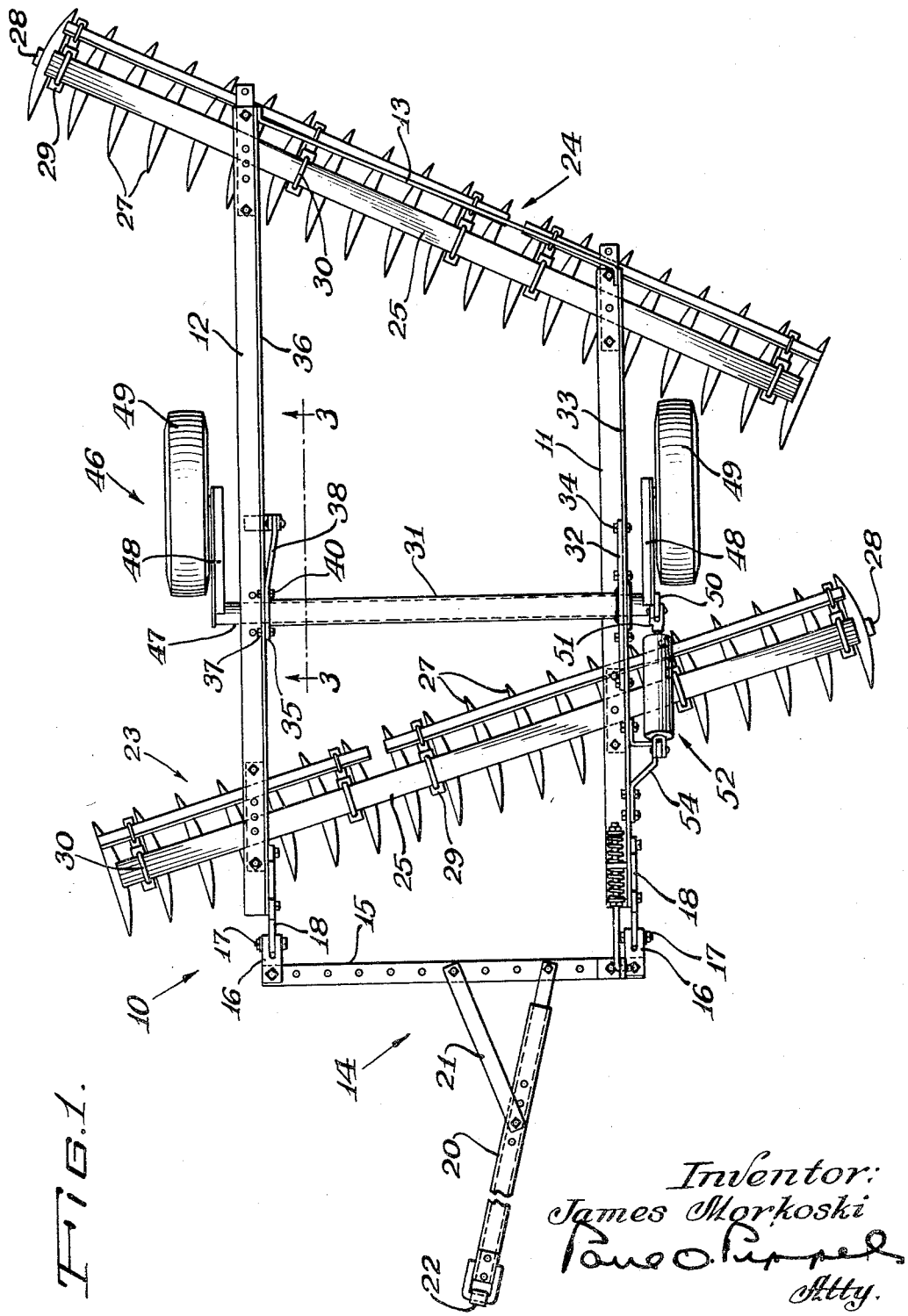
Inventor:
James Morkoski
Atty.

Sept. 5, 1961        J. MORKOSKI        2,998,854
DISK HARROW
Filed Dec. 19, 1958                                       2 Sheets-Sheet 2
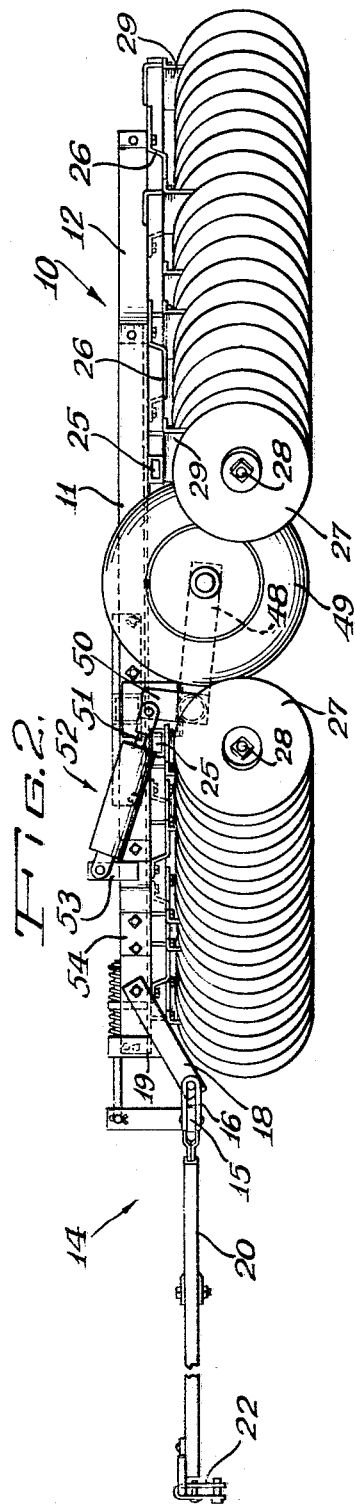
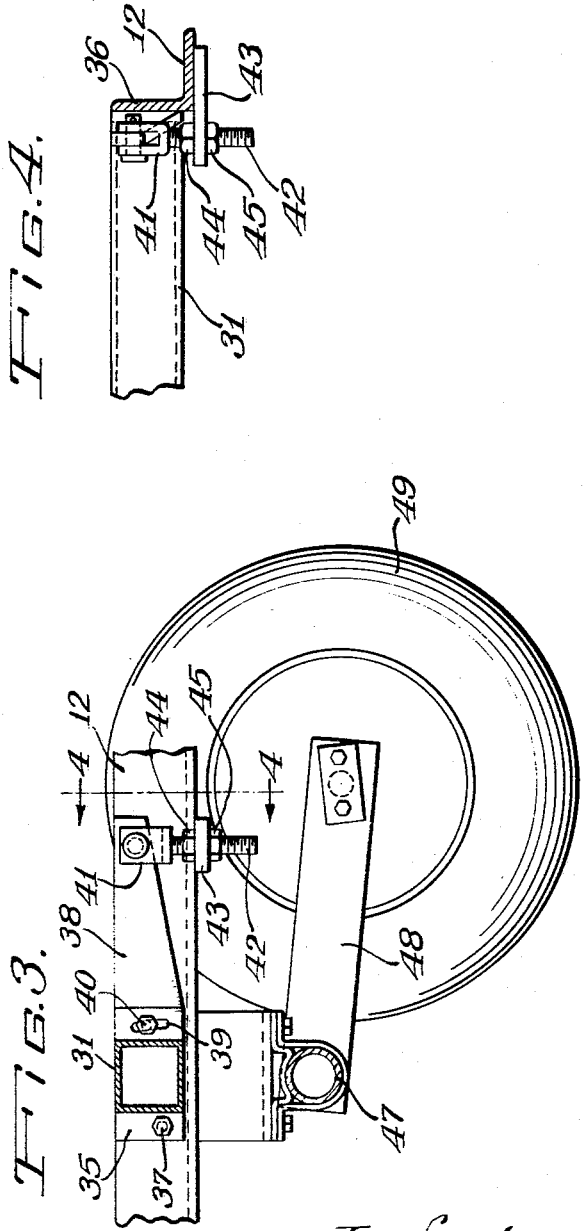
Inventor:
James Morkoski
Paul O. Pippel
Atty.

United States Patent Office 2,998,854
Patented Sept. 5, 1961

2,998,854
DISK HARROW
James Morkoski, Des Plaines, Ill., assignor to International Harvester Company, Chicago, Ill., a corporation of New Jersey
Filed Dec. 19, 1958, Ser. No. 781,731
4 Claims. (Cl. 172—600)

This invention relates to agricultural implements and particularly to disk harrows. More specifically, the invention concerns improved means for controlling the operating characteristics of tandem disk harrows.

The novel harrow construction which is the object of this invention is described in its application to an offset disk harrow of the wheel-controlled type wherein the laterally converging disk gangs retain their angled relationship in operating as well as transport positions, the wheels being carried by the frame between the gangs and vertically movable to lift the frame and the disk gangs above the ground.

Such a machine should be allowed to float and follow the ground contour in operation but is inherently subject to the stress of ground forces causing non-uniform penetration, and an object of the invention is the provision of novel means insuring the uniform penetration of both gangs and of all the disks thereof.

Further, the tendency is for the forward disk of both gangs to dig too deeply, and another object of the invention is to provide a novel harrow construction in which provision is made for offsetting this tendency.

Other objects and advantages of the invention will become clear from the following detailed description when read in conjunction with the accompanying drawings wherein:

FIGURE 1 is a plan view of an offset disk harrow embodying the features of this invention;

FIGURE 2 is a view in side elevation of the structure shown in FIGURE 1;

FIGURE 3 is a section taken on the line 3—3 of FIGURE 1; and

FIGURE 4 is a section taken on the line 4—4 of FIGURE 3.

The harrow of this invention comprises a generally rectangular frame structure designated by the numeral 10 having side rails or frame bars 11 and 12, the latter being somewhat longer than bar 11, the rear ends being connected by a diagonally extending brace 13.

At the front end of the tool-carrying frame 10 is a hitch frame 14 comprising a transversely extending pull bar 15 to the ends of which are secured rearwardly extending clevises 16 pivotally mounted on bolts 17 carried at the ends of straps 18 secured at one end to the forward ends of the bars 11 and 12 and extending forwardly and downwardly therefrom. Each of the straps 18 is angularly adjustable by the provision of a lug 19 secured to the strap and having a plurality of openings therein for adjustable connection to the associated frame bar. Hitch frame 14 also includes a draft bar 20 connected at its rear end to the pull bar 15 and braced by a strap 21. The forward end of the draft bar 20 is provided with a clevis 22 for connection to a tractive vehicle.

The frame bars 11 and 12 are horizontal and normally parallel and serve to support the front and rear disk gangs 23 and 24 which extend diagonally relative to the direction of travel and converge laterally. The construction of each of the gangs 23 and 24 is substantially the same. Each of the gangs comprises an elongated beam 25 supported by brackets 26 affixed to the underside of the frame bars 11 and 12. For the purposes of this invention it may be understood that the disks 27 are mounted on shafts 28 supported at the lower ends of a plurality of depending brackets 29 secured to the beam 25 by U-bolts 30.

It will be noted that the concave faces of the disks 27 face forwardly and in operation the forwardmost disk tends to dig deeper into the earth while the rearmost disks of the same gang tend to penetrate shallower resulting in uneven penetration and faulty operation of the implement. This is overcome by the provision of a transversely extending rigid bracing member 31 having an elongated plate 32 affixed, as by welding, to one end thereof, the plate being parallel to the upwardly extending flange 33 of frame angle bar 11 and secured thereto by a plurality of bolts 34. The other end of brace 31 has a flange 35 on one side thereof abutting the upright flange 36 of right-hand frame bar 12 and connected to the latter by a pivot bolt 37.

Brace 31 is square in cross-section and to the end thereof on the side opposite flange 35 is affixed a lever arm 38 having a slot 39 formed therein to receive a bolt 40 carried by the frame bar 12. To the outer end of lever 38 is pivotally connected the U-shaped head 41 of a threaded bolt 42 adjustably received in an opening provided in a lug 43 affixed to the underside of frame bar 12 and projecting inwardly therefrom. A pair of nuts 44 and 45 are provided, one on each side of the lug 43 and threaded on the bolt 42 to hold arm 38 and brace 31 rigid with respect to bar 12. By loosening and adjusting the nuts 44 and 45 on the shank of bolt 42 angular displacement is effected between the brace 31 and the frame bar 12 resulting in relative angular displacement as between the two frame bars 11 and 12. For example, upward movement of lever arm 38 relative to frame bar 12 puts torque stress into brace 31 tending to exert pressure upwardly on the forward end of bar 12 supporting the forward end of the front gang 23 while exerting a downward pressure on the rear end of said bar, the opposite effect taking place in the frame bar 11 tending to hold the gangs level.

The disk gang supporting frame is mounted on a ground wheel unit 46 comprising a transverse shaft 47 rotatably carried by the tool frame below brace 31 and having rearwardly and downwardly extending arms 48 affixed to opposite ends thereof. Each of the arms 48 carries a wheel 49 at its end and is capable of vertical swinging in response to rocking of the shaft 47 to raise and lower the tool frame. Rocking of the shaft 47 is accomplished by the provision of an upright arm 50 affixed to the left-hand end of shaft 47 and pivotally connected to the piston rod 51 of a hydraulic ram 52 anchored to a lug 53 affixed to a bracket 54 secured to the flange 33 of frame bar 11. Fluid under pressure is supplied to the ram 52 to extend and retract the piston rod 51 therein from a source of fluid under pressure, not shown, preferably forming a part of the tractive vehicle by which the implement is propelled.

It is believed that the apparatus described herein by which down pressure is exerted against the lefthand end of the front disk gang 23 when viewed from the rear while down pressure is exerted against the right-hand end of the rear gang 24 to cause all of the disks of each gang to penetrate the ground uniformly, will be clearly understood from the foregoing description. It should likewise be understood that the invention has been described in its preferred embodiment and that modifications may be made in the invention without departing from the spirit thereof or the scope of the appended claims.

What is claimed is:

1. In an offset disk harrow having a frame including horizontal laterally spaced frame bars having laterally convering tandem disk gangs secured thereto and a hitch frame vertically pivotable relative to said frame bars for connection to a draft source, the combination of connecting means between said bars for holding them in spaced relationship comprising a rigid member affixed at one end to one of said bars and having a flange at its other end engageable with the other of said bars, and means in the connection of said rigid member to said other of said bars for twisting the frame to counteract the tendency of the forward end of each gang to penetrate more deeply than the rear end thereof, comprising a pivot member connecting said flange to the associated bar, a lever arm on said other end of said rigid member, and an adjustable connection between the lever arm and said other of said bars for angularly adjusting the latter relative to said rigid member.

2. In a disk harrow of the type wherein a pair of tandem disk gangs are mounted in laterally converging relation on a rigid support, the forward end of each of said gangs having a tendency to penetrate the ground more deeply than the rear end thereof, said support including laterally spaced longitudinally extending parallel frame bars to which the gangs are secured, the combination of a brace extending transversely of the support between said bars and having one end thereof rigidly affixed to one of said bars, means for counteracting said tendency of the forward ends of the gangs to penetrate more deeply than the other ends thereof, including means adjustably securing the other end of said brace to the other of said frame bars, said last mentioned means comprising means serving as a pivot accommodating relative angular movement between said other frame bar and said brace, and additional connecting means between the brace and said other frame bar arranged to hold them rigidly in selected position.

3. In a disk harrow of the type wherein a pair of tandem disk gangs are mounted in laterally converging relation on a rigid support, the forward end of each of said gangs having a tendency to penetrate the ground more deeply than the rear end thereof, said support including laterally spaced longitudinally extending parallel frame bars to which the gangs are secured, the combination of a brace extending transversely of the support between said bars and having one end thereof rigidly affixed to one of said bars, means for counteracting said tendency of the forward ends of the gangs to penetrate more deeply, comprising pivot means connecting the other end of said brace to the other of said frame bars, an arm affixed to said brace and extending outwardly therefrom, and adjustable means connecting said arm to said other frame bar for effecting angular adjustment therebetween and for holding them rigidly in adjusted position.

4. In an offset disk harrow having a frame including a pair of longitudinally extending laterally spaced frame bars having a pair of horizontal laterally converging disk gangs mounted on and depending from said bars, means for twisting the frame about a transverse axis to offset the tendency of the forward end of each said gang to penetrate more deeply than the rear end thereof, comprising a transverse brace member extending between and affixed at one end to one of said bars, adjustable means rigidly securing the other end of the brace member to the other of said bars, said means being adjustable to angularly displace said other of said bars relative to said brace member and said one of said bars, and means for rigidly holding said other of said bars in a selected adjusted position.

References Cited in the file of this patent

UNITED STATES PATENTS

| | | |
|---|---|---|
| 2,604,746 | Frank et al. | July 29, 1952 |
| 2,669,818 | Pursche | Feb. 23, 1954 |
| 2,857,724 | Kenney et al. | Oct. 28, 1958 |